(12) United States Patent
Malo

(10) Patent No.: US 6,819,833 B1
(45) Date of Patent: Nov. 16, 2004

(54) IN-FIBER CONTINUOUSLY CHIRPED GAIN FLATTENING FILTERS AND METHOD

(75) Inventor: Bernard Y. Malo, Gatineau (CA)

(73) Assignee: Avanex Corporation, Fremont, CA (US)

( * ) Notice: Subject to any disclaimer, the term of this patent is extended or adjusted under 35 U.S.C. 154(b) by 20 days.

(21) Appl. No.: 09/892,469

(22) Filed: Jun. 28, 2001

Related U.S. Application Data

(60) Provisional application No. 60/215,094, filed on Jun. 29, 2000.

(51) Int. Cl.[7] .................................................. G02B 6/34
(52) U.S. Cl. ............................... 385/37; 385/10; 385/5; 385/6
(58) Field of Search .............................. 385/37, 10, 5, 385/6

(56) References Cited

U.S. PATENT DOCUMENTS

| | | | | |
|---|---|---|---|---|
| 4,655,547 A | * | 4/1987 | Heritage et al. | 359/563 |
| 4,746,193 A | * | 5/1988 | Heritage et al. | 359/559 |
| 5,367,588 A | * | 11/1994 | Hill et al. | 385/37 |
| 5,881,188 A | * | 3/1999 | Starodubov | 385/37 |
| 5,903,689 A | * | 5/1999 | Painchaud et al. | 385/37 |
| 6,269,208 B1 | * | 7/2001 | Bhatia et al. | 385/37 |
| 6,289,699 B1 | * | 9/2001 | Kewitsch et al. | 65/406 |
| 6,330,383 B1 | * | 12/2001 | Cai et al. | 385/37 |
| 6,404,956 B1 | * | 6/2002 | Brennan et al. | 385/37 |
| 6,453,095 B2 | * | 9/2002 | Feng et al. | 385/37 |

OTHER PUBLICATIONS

Phase Mask Technology Overview—Impact of Phase Mask Technique in Guided Wave Device Production—S.K. Kuma et al OPS Technology Inc.

Transmission Edge Filters for Power Equalization of EDFA's—Lawrence Chen et al—IEEE Photonics Technology Letters—vol. 12, No. 7, Jul. 2000—pp 882–824.

Laser Trimming Method for Adjustment of Grating Offset in Optical Fiber Grating Couplers—Yokota et al– Dept. of Systems Engineering, Faculty of Engineering, Ibaraki Univ.—Japan.

Bragg Gratings Fabricating in Monomode Photosensitive Optical Fiber by UV Exposure Through a Phase Mask— K.O. Hill et al—Appl Phys. Lett. 62 (10) Mar. 8, 1993—pp 1035–1037.

* cited by examiner

*Primary Examiner*—Frank G. Font
*Assistant Examiner*—Kevin C Kianni
(74) *Attorney, Agent, or Firm*—Moser, Patterson & Sheridan, L.L.P.

(57) ABSTRACT

The present invention seeks to provide a GFF with a technique amenable to manufacturing in large volume and having a filter with a more precise control of the spectral response.

6 Claims, 2 Drawing Sheets

IN-FIBER CONTINUOUSLY CHIRPED GAIN FLATTENING FILTERS AND METHOD

This application claims the benefit of Provisional application Ser. No. 60/215,094, filed Jun. 29, 2000.

FIELD OF INVENTION

This invention relates to a method of manufacturing continuously chirped, gain flattening filters in optical fiber and waveguide passive components for applications such as telecommunications and sensors.

BACKGROUND TO THE INVENTION

In Optical Communications, passive components are needed to format the transmitted light signals. An opto-electronic component, so as an optical filter, must achieve a very specific filter shape. The filter shape is defined as the relationship between the reflectivity and the wavelength within the filtered band. Each filter shape may be designed or fabricated for a particular application.

The Erbium Doped Fiber Amplifier (EDFA) was introduced to provide optical amplification for many separate light signals. The EDFA transmits and periodically regenerates optical light signals. The singular use of the EDFA in an optical network poses a problem since the amplifier gain of an EDFA, is not constant across its useful amplification spectrum. Gain Flattening Filters (GFF) were developed to counter balance the transmission characteristics of the EDFA. The GFF coupled to the EDFA produces a flattened gain across the amplifier band.

In the past, the GFF was fabricated using a myriad of techniques. The most common techniques being the use of thin film coating, planar waveguides, or the concatenation of many Fiber Bragg Gratings (FBG). The above-mentioned techniques have proved to be insufficient as performance characteristics, such as insertion loss, filter shape accuracy, and temperature stability, were inadequate. A GFF with 5 to 6 dB peak attenuation produced a filter shape with an accuracy no lower than 0.5 dB.

U.S. Pat. No. 5,367,588, granted to Hill et al., discloses a method of fabricating Bragg Gratings using a silica glass phase grating mask The silica glass phase grating mask is positioned between a laser producing a UV light beam and in close proximity to the optical waveguide. Laser irradiation through the phase grating mask results in an interference pattern which is imprinted (photo-induced) into the core of the optical waveguide. The photo-induced refractive index modulation forms a fiber Bragg grating which selectively reflects light of specific wavelengths, depending on the modulation periodicity.

The phase mask is described as a one-dimensional surface relief structure fabricated in a flat substrate of high quality fused silica transparent to the laser irradiation. The laser irradiation through the phase mask may produce periodic and aperiodic variation in the index of refraction in the optical waveguide depending on the periodicity of the mask. A chirped FBG refers to a variable pitch in a particular grating. Chirping causes wavelengths within an optical fiber to be reflected according to the varying pitch of the grating.

SUMMARY OF THE INVENTION

The present invention seeks to provide a GFF with a technique amenable to manufacturing in large volume and having a filter with a more precise control of the spectral response.

The present invention involves the use of a single Bragg Grating to cover the entire wavelength band to be filtered. A Bragg Grating may be described as a periodic or aperiodic perturbation of the effective refractive index of an optical waveguide. Essentially, a Bragg Grating may reflect a predetermined band of wavelengths of light incident on the grating, while passing all other wavelengths of light.

Bragg Gratings are photo-imprinted into a photosensitive optical waveguide material. Photo-imprinting the optical waveguide material involves the irradiation of an optical waveguide material in order to change the refractive index of the core of the optical waveguide. Under ideal conditions, irradiation of the optical waveguide with an interference pattern of light causes a permanent index modulation induced in the core of the optical waveguide. The end result is a grating that is photo-imprinted in the core of the optical waveguide. A Fiber Bragg Grating (FBG) is a narrowband filter permanently imprinted into the core of the optical fiber.

The present invention provides a method for producing continuously chirped Gain Flattening Filters (GFF) in a single Bragg Grating. The method utilizes a phase mask which is chirped continuously along its length to cover the entire GFF band and an amplitude mask. In a first step, an approximate GFF profile is formed by irradiating through both a continuously chirped phase mask and an amplitude mask into the core of the optical waveguide. The amplitude mask is used to control the amount of light reaching each section of the phase mask and thus to control the attenuation of the various wavelengths within the band. In a subsequent step, each particular wavelength region within the filter is locally irradiated to achieve a more precise spectral response from the GFF. The UV light beam may be adjusted and positioned to focus on a particular wavelength region of the filtered band. Through the strong chirp of the phase mask, there is a direct relationship betwen wavelength and position along the grating length.

In a first aspect, the invention provides a method of making a continuously chirped gain flattening filter in a single Bragg grating in an optical waveguide material, including the steps of:

disposing a strongly chirped phase mask placed between a light beam and the optical waveguide material, the light beam being capable of changing the effective index of refraction of the optical waveguide material, and irradiating said optical waveguide material with said light beam non-uniformly through the phase mask, said irradiation producing a suitable filter response and required attenuation over the filter band.

The non-uniform irradiation may be provided by an amplitude mask in the light beam, a narrow slit positioned along different parts of the light beam for different amounts of time, or a combination of both.

BRIEF DESCRIPTION OF THE DRAWINGS

A better understanding of the invention may be obtained by reference to the detailed description of the invention below, in conjunction with the following drawings, in which.

DETAILED DESCRIPTION

Figure 1:
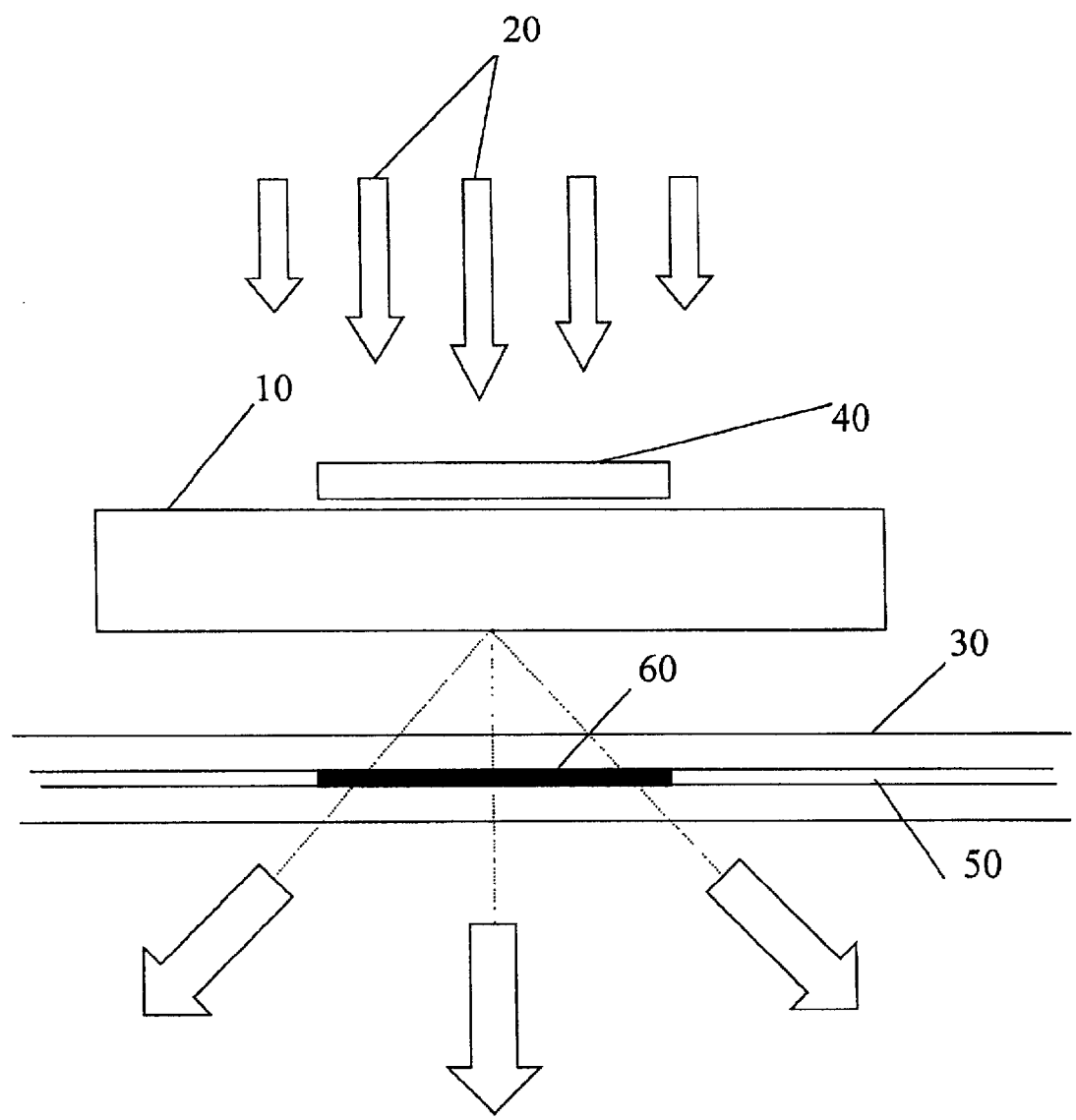
FIG. 1 is a schematic representation of apparatus for photo-imprinting a refractive index Bragg Grating in a photosensitive optical fiber waveguide.

FIG. 1 illustrates the phase mask 10 disposed between a light beam source 20 and an optical waveguide 30. An amplitude mask 40 is placed in front of the phase mask. The phase mask 10 has chirped gratings used for precise photo-imprinting of chirped gratings 60 in the core 50 of the optical waveguide. The chirped gratings 60 may be described as periodic variations in index of refraction with a varying pitch along the length of the grating 60. The amount of light passing through the amplitude mask 40 should correspond to the position along the length of the grating 60 such that the refractive index change required at each point along the gain flattening filter is obtained. The phase mask 10 may be made of flat high-quality fused silica or any solid material transparent to the light used. The amplitude mask is made of a material strong enough to block selectively parts of the light beam without being damaged, such as steel. As well, a UV light beam source 20 is preferred for Bragg grating photo-imprinting purposes. Prior to irradiation, the optical waveguide 30 should be a photosensitive material. For GFF purposes, a photosensitized optical fiber most suitable.

Figure 2:
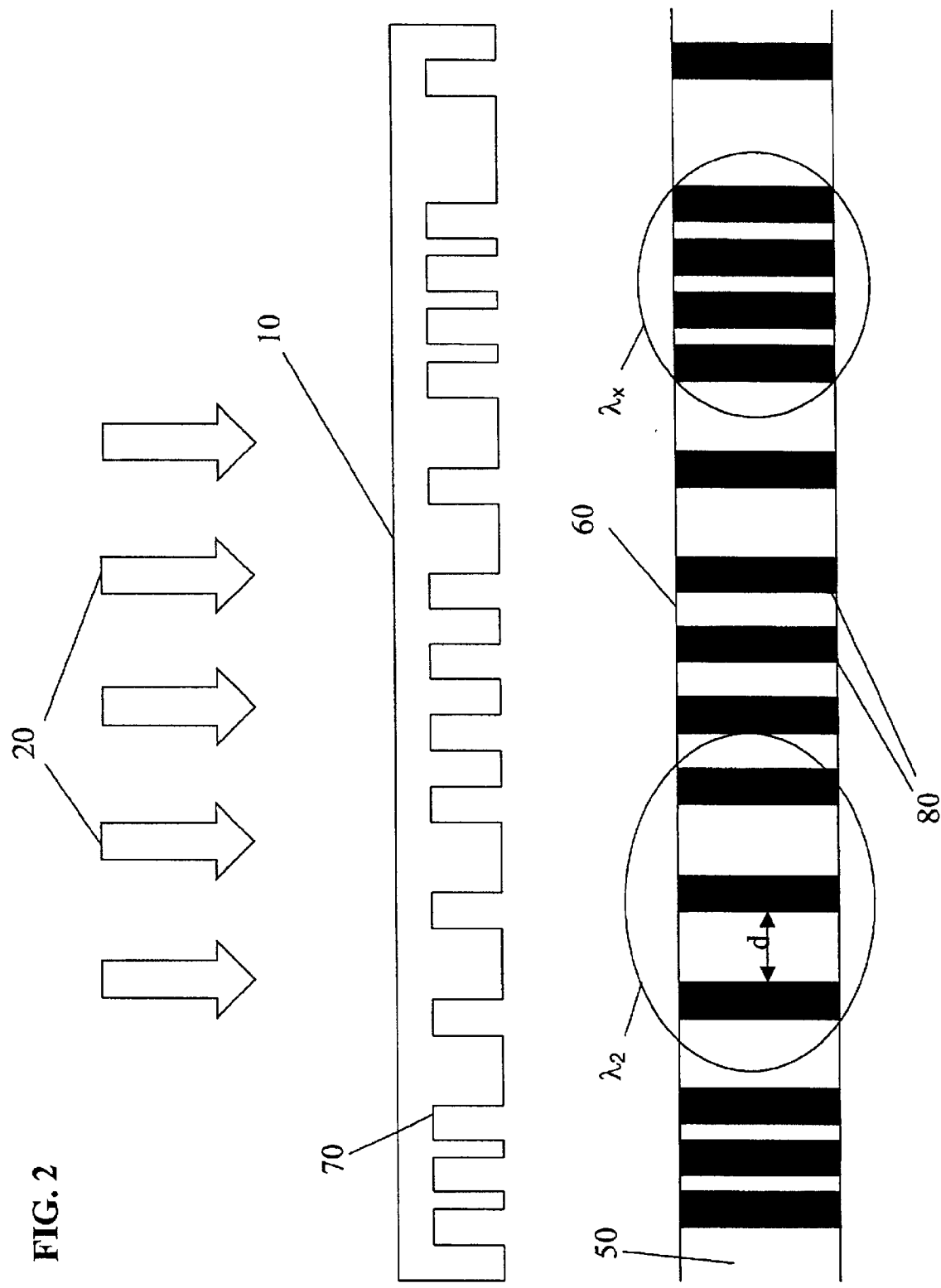
FIG. 2 is a simplified illustration of a continuously chirped phase mask for global irradiation of a photosensitive optical fiber waveguide.

FIG. 2 further illustrates the surface-relief pattern 70 of the phase mask 10. The UV beam 20 passing through the chirped portion of the phase mask globally irradiates the optical fiber strand 50. The fiber is exposed over the full length of the grating through an amplitude mask 40 positioned in front of the phase mask 10. The amplitude mask 40 controls the intensity of the UV beam along the length of the fiber and therefore the attenuation at each wavelength, the purpose being to obtain a general but slighlty overexposed approximation to the GFF profile in a single exposure.

The irradiation produces a general or approximate filter shape with an approximate spectral response. More specifically, the change in the UV index of refraction is photo-induced in the core of the optical fiber. The chirped profile of the phase mask 10 translates into a continuously chirped grating 60. The grating 60 has a variable pitch between permanent index perturbations 80. The filter may be divided into several individual wavelength regions. As illustrated, the pitch of $\lambda_2$ differs from that of $\lambda_x$. The pitch, d, describes the Bragg spacing corresponding to the wavelength region, $\lambda_2$. The single Bragg grating 60 shown has an approximate spectral response chirped to cover the entire wavelength band to be filtered. To trim this approximate spectral response to a highly accurate GFF, an additional step is required.

The additional step consists of replacing the amplitude mask by a movable, adjustable slit which is used to limit the laser irradiation to specific portions of filter for various amounts of time, the filter response being monitored in real time and compared to the target response during the process. This allows a very fine control of the filter shape. In practice, the final target response is exceeded to allow for the loss in attenuation which occurs upon thermal stabilisation of the final product. One could think of fabricating the whole filter with the movable, adjustable slit but that would be much longer and hence less desirable in terms of efficiency.

A person understanding the above-described invention may now conceive of alternative designs, using the principles described herein. All such designs which fall within the scope of the claims appended hereto are considered to be part of the present invention.

I claim:

1. A method of making a continously chirped highly accurate gain flattening filter in a single Bragg grating in an optical waveguide material, including the steps of:

disposing a strongly chirped phase mask placed between a light beam and the optical waveguide material, the light beam being capable of changing the effective index of refraction of the optical waveguide material, and irradiating said optical waveguide material with said light beam non-uniformly through the phase mask, said irradiation producing an approximate filter response and attenuation over the filter band, replacing said phase mask with a movable, adjustable slit to irradiate selected portions of said filter, for predetermined periods of time, while monitoring said filter response, comparing said filter response to a target response, and ceasing irradiation when said filter response is in agreement with said target response.

2. A method as defined in claim 1 in which the light beam is an ultraviolet light beam.

3. A method as defined in claim 1 in which an amplitude mask is used to control the amount of light along the grating.

4. A method as defined in claim 1 in which the optical waveguide material is an optical fiber.

5. A method as defined in claim 1, further including the step of stabilizing said change in effective index of refraction in the optical waveguide material.

6. A method as defined in claim 5, wherein the step of stabilizing said change in effective index of refraction is produced by annealing the optical waveguide material.

* * * * *